United States Patent
Thomas et al.

(10) Patent No.: US 6,525,869 B1
(45) Date of Patent: Feb. 25, 2003

(54) RAMAN AMPLIFIER

(75) Inventors: Richard Thomas, Halstead (GB); Jowan Masum-Thomas, Halstead (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/846,094

(22) Filed: Apr. 30, 2001

(51) Int. Cl.[7] .............. H01S 3/30; H04B 10/12
(52) U.S. Cl. ............. 359/334; 359/341.3; 359/337.1
(58) Field of Search ............... 359/334, 341.3, 359/337.1, 341.32, 341.1

(56) References Cited

U.S. PATENT DOCUMENTS

| | | | | |
|---|---|---|---|---|
| 5,530,584 A | * | 6/1996 | Myslinski et al. | 359/337.1 |
| 5,623,508 A | * | 4/1997 | Grubb et al. | 372/3 |
| 5,701,194 A | * | 12/1997 | Meli et al. | 359/341.1 |
| 5,875,203 A | * | 2/1999 | Wagener et al. | 372/1 |
| 6,204,960 B1 | * | 3/2001 | Desurvire | 359/115 |
| 6,259,555 B1 | * | 7/2001 | Meli et al. | 359/337 |
| 6,292,288 B1 | * | 9/2001 | Akasaka et al. | 359/124 |
| 6,304,368 B1 | * | 10/2001 | Hansen et al. | 359/134 |
| 6,310,716 B1 | * | 10/2001 | Evans et al. | 359/124 |
| 6,320,884 B1 | * | 11/2001 | Kerfoot et al. | 359/334 |
| 6,330,104 B1 | * | 12/2001 | Kim et al. | 359/332 |
| 6,335,820 B1 | * | 1/2002 | Islam | 359/334 |
| 6,344,922 B1 | * | 2/2002 | Grubb et al. | 359/134 |
| 6,356,383 B1 | * | 3/2002 | Cornwell et al. | 359/334 |
| 6,359,725 B1 | * | 3/2002 | Islam | 359/334 |
| 6,388,800 B1 | * | 5/2002 | Christodoulides et al. | 359/334 |
| 6,466,363 B1 | * | 10/2002 | Masum-Thomas et al. | 359/334 |
| 2002/0063948 A1 | * | 5/2002 | Islam et al. | 359/334 |

OTHER PUBLICATIONS

Hamoir et al. "Optimized, two–stage architecture for Raman amplifiers." Optical Amplifiers and Their Applications, 2000, Jul. 2000, pp. 69–98).*

* cited by examiner

*Primary Examiner*—Thomas G. Black
*Assistant Examiner*—Andrew R. Sommer
(74) *Attorney, Agent, or Firm*—Lee, Mann, Smith, McWilliams, Sweeney & Ohlson

(57) ABSTRACT

An optical amplifier has at least first stage in the form of a distributed Raman amplifier and a second stage in the form of a discrete Raman amplifier. The discrete amplifier has an output for unused pump power, and the distributed Raman amplifier is pumped using the unused pump power from the second stage. This arrangement enables unused pump power to be used in a distributed Raman amplifier, in particular using the transmission fiber at the input to the second stage amplifier.

9 Claims, 2 Drawing Sheets

RAMAN AMPLIFIER

FIELD OF THE INVENTION

The present invention relates to a Raman amplifier, for example for use in an optical fibre communications system.

BACKGROUND TO THE INVENTION

A Raman amplifier is a well known amplifier configuration. This amplifier uses conventional fiber (rather than doped fibers), which may be co- or counter-pumped to provide amplification over a wavelength range which is a function of the pump wavelength. The Raman amplifier relies upon forward or backward stimulated Raman scattering. Typically, the pump source is selected to have a wavelength of around 100 nm below the wavelength over which amplification is required.

Raman amplifiers are increasingly being used to improve the overall gain characteristics of high capacity optical wavelength division multiplexed (WDM) communications systems. Raman amplifiers have the advantage that they do not attenuate signals outside the wavelength range over which amplification takes place. However, high power pump sources are required, and it may be difficult in practice to implement pump sources of the required pump wavelength and power. In addition, it is usual to provide a separate pump sources for each wavelength required, typically in the form of separate Raman fibre lasers or semiconductor pumps.

Raman amplifiers can be designed as discrete (off-the-shelf) components, in which case the fibers used and the pump sources will be selected to achieve specific gain requirements. Typically, a number of pump sources are provided in order to provide a flat gain spectrum. There will always, however, be wasted pump power, as not all pump power is used within the amplifier. It is known that output can be provided from the discrete amplifier to which unused pump light is routed.

Raman amplification can also be induced in the fiber used for transmission of the optical data signal. This arrangement is known as a distributed Raman amplifier. In a distributed Raman amplifier, the maximum pump power is limited by eye safety issues, as there is a risk in distributed systems of an operator being exposed to the optical pump signal in the event of a fiber cut or other disconnection within the system. For example, a maximum pump power of around 500 mW may be appropriate.

It would be desirable to increase the efficiency of discrete Raman amplifiers by improving the pump power usage.

SUMMARY OF THE INVENTION

According to the invention, there is provided an optical amplifier comprising at least first and second stages in which the second stage comprises at least one pump source and has an output for unused pump power, and wherein the first stage comprises a distributed Raman amplifier pumped using the unused pump power from the second stage.

This arrangement enables unused pump power to be used in a distributed Raman amplifier, in particular using the transmission fiber at the input to the second stage amplifier. The second stage preferably comprises a discrete Raman amplifier.

The second stage is preferably counter-pumped, and the unused pump power propagates into the transmission fiber at the input of the second stage, the transmission fiber at the input of the second stage thereby forming the first stage of the amplifier.

A filter may be provided at the input of the second stage for shaping the intensity profile of the unused pump power propagating from the second stage to the first stage. The unused residual pump power will be dependent on the characteristics of the second stage amplifier. Typically, the shorter wavelength pumps will be attenuated more than the longer wavelength pumps, and the filter is used to reshape the residual pump spectrum before using it in the distributed first stage amplifier.

Alternatively (or additionally) one or more additional pump sources may be provided for providing additional pump power to the first stage. This enables the gain of the combined amplifier to be equalised through control of the additional pump sources. In particular, the second stage may be counter pumped using a plurality of pump sources of different wavelengths, and wherein the one or more additional pump sources are for providing, in combination with the unused pump power, a desired intensity profile of the pump power provided to the fist stage.

The additional pump sources do need to be high power sources, as they are only required to alter the pump power spectrum sufficiently to flatten the overall gain spectrum. This enables gain equalization without significant losses resulting from filtering operations.

The invention also provides a wavelength division multiplex (WDM) optical communications system comprising a transmitter for generating signal radiation of wavelength in an operating wavelength range, a receiver for receiving for detecting the signal radiation, and an optical fiber link between the transmitter and the receiver, wherein one or more optical amplifiers are provided in the link, at least one amplifier comprising an amplifier having at least first and second stages in which the second stage comprises at least one pump source and has an output for unused pump power, and wherein the first stage comprises a distributed Raman amplifier pumped using the unused pump power from the second stage.

The invention also provides a method of amplifying optical signals, the method comprising supplying optical signals for amplification to the first stage of a multiple stage Raman amplifier, the multiple stage Raman amplifier comprising at least first and second stages, the first stage comprising a distributed Raman amplifier, the method comprising amplifying the signal in the first stage by providing a pump signal to the first stage, the pump signal including unused pump power from the second stage, and subsequently amplifying the signal in the second stage.

The pump signal to the first stage may include additional pump power selected such that the combined pump powers provide a desired pump power spectrum.

BRIEF DESCRIPTION OF THE DRAWINGS

Examples of the present invention will now be described in detail with reference to the accompanying drawings, in which.

DETAILED DESCRIPTION

Figure 1:
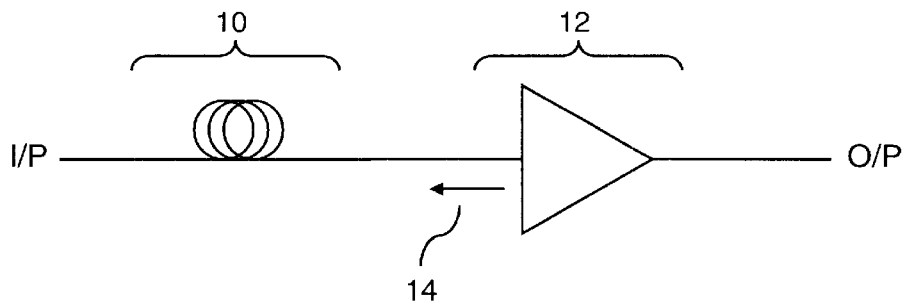
FIG. 1 shows one example of a Raman amplifier according to the present invention.

FIG. 1 shows one example of a Raman amplifier according to the invention comprising first 10 and second 12 stages. The second stage comprises a discrete Raman amplifier having at least one pump source, and is provided with an output for unused pump power. The first stage comprises a distributed Raman amplifier, pumped using the unused pump power 14 from the second stage. The first and second stages function as pre- and post-amplifiers.

The first stage comprises a length of the transmission fiber at the input to the discrete Raman amplifier 12, and is counter-pumped by introducing the unused pump power 14 into the transmission fiber at the input of the discrete Raman amplifier. This arrangement is suitable for basic amplifiers, as there is no control of the available residual pump power, which is dependent on the gain of the discrete amplifier. As the gain of the discrete amplifier decreases, the gain of the distributed pre-amplifier will also decrease.

Figure 2:
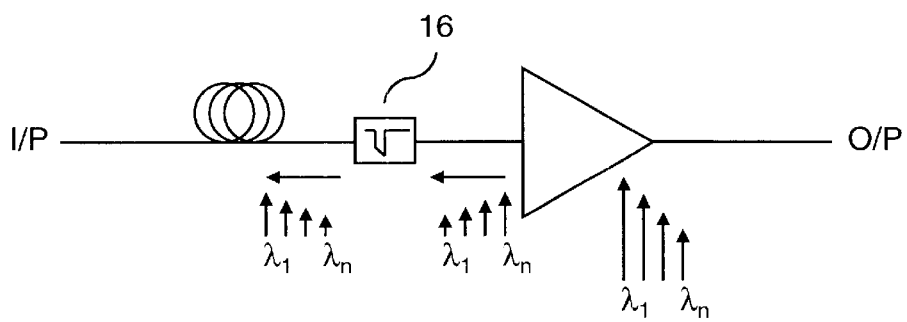
FIG. 2 shows a second example of a Raman amplifier according to the present invention.

Broadband discrete Raman amplifiers use a number of pump sources, as shown in FIG. 2 schematically as $\lambda_1$ to $\lambda_n$, and it is possible to use the same wavelength pump signals for the discrete and distributed amplifiers. However, it is necessary to reshape the residual pump power spectrum before using it to pump the distributed amplifier, as the shorter wavelengths are invariably attenuated more than the longer wavelengths, as shown schematically in FIG. 2. An in-line notch filter 16 is used in the example of FIG. 2 with a stopband attenuation profile selected to reshape the counter-propagating pump signal without affecting the WDM signals to be amplified. The reshaped profile is also shown schematically in FIG. 2. The reshaped pump spectrum provides a desired gain profile from the distributed Raman amplifier.

Figure 3:
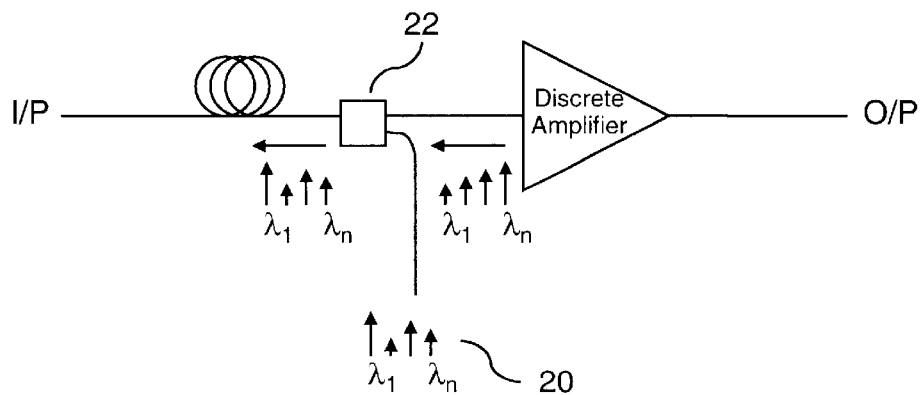
FIG. 3 shows a third example of a Raman amplifier according to the present invention.

FIG. 3 shows how additional pump sources 20 may be used to provide additional pump power to the distributed Raman amplifier, in order to effect the desired reshaping of the pump power spectrum. The additional pump power is introduced at WDM coupler 22. The additional pump sources 20 do need to be high power sources, as they are only required to alter the pump power spectrum of the unused residual pump power sufficiently to alter the overall gain spectrum. This enables gain equalization without significant losses resulting from filtering operations.

The filtering and addition of pump power may also be used in combination.

Figure 4:
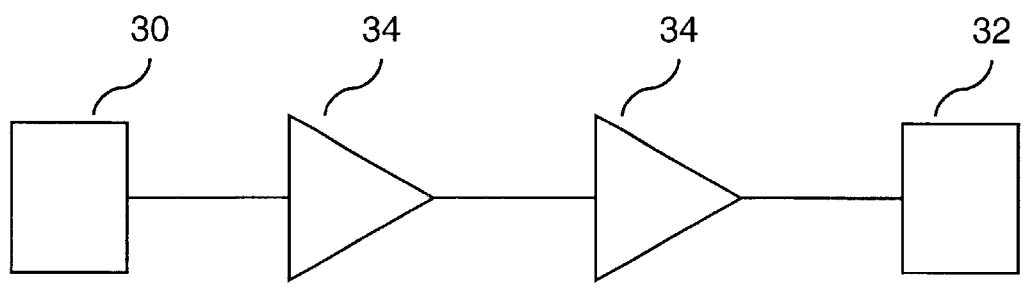
FIG. 4 shows an optical communications system the amplifier of the invention.

The invention enables residual pump power from a discrete Raman amplifier to be utilised, and also provides ways of reshaping the unused pump power to provide useful Raman amplification in a distributed Raman amplifier. The amplifier of the invention can be used in wavelength division multiplex (WDM) optical communications system. FIG. 4 shows such a system, comprising a transmitter 30 for generating signal radiation of wavelength in an operating wavelength range, a receiver 32 for receiving the signal radiation, and an optical fiber link between the transmitter and the receiver. Optical amplifiers 34 of the invention are provided in the link. The amplifier of the invention may be used in combination with other amplifiers to provide a desired gain profile over a range of wavelengths of interest.

The specific choices of fiber length of the distributed pre-amplifier will be selected as a function of the characteristics of the discrete amplifier, and in particular the nature of the residual pump power. In all examples of the invention, optical signals for amplification are supplied to a distributed Raman amplifier forming the first stage of a multiple stage Raman amplifier. The signal is amplified in the first stage by a pump signal which includes unused pump power from the second stage, which comprises a discrete Raman amplifier. The signal is then amplified in the second stage.

We claim:
1. An optical amplifier comprising at least first and second stages in which the second stage comprises a plurality of pump sources and has an output for unused pump power at the input of the second stage, and wherein the first stage comprises a distributed Raman amplifier pumped using the unused pump power from the second stage, and wherein a filter is provided at the input of the second stage for shaping the intensity profile of the unused pump power propagating from the second stage to the first stage.

2. An amplifier as claimed in claim 1, wherein the second stage comprises a discrete Raman amplifier.

3. An amplifier as claimed in claim 1, wherein the signal is supplied to the second stage along a transmission fiber, wherein the second stage is counter-pumped, and the unused pump power propagates into the transmission fiber at the input of the second stage, the transmission fiber at the input of the second stage thereby forming the first stage of the amplifier.

4. An amplifier as claimed in claim 3, further comprising one or more additional pump sources for providing additional pump power to the first stage.

5. An amplifier as claimed in claim 4, wherein the second stage is counter pumped using a plurality of pump sources of different wavelengths, and wherein the one or more additional pump sources are for providing, in combination with the unused pump power, a desired intensity profile of the pump power provided to the first stage.

6. A wavelength division multiplex (WDM) optical communications system comprising a transmitter for generating signal wavelengths in an operating wavelength range, a receiver for receiving and detecting the signal radiation, and an optical fiber link between the transmitter and the receiver, wherein one or more optical amplifiers are provided in the link, at least one amplifier comprising an amplifier having at least first and second stages in which the second stage comprises a plurality of pump sources and has an output for unused pump power at the input of the second stage, and wherein the first stage comprises a distributed Raman amplifier pumped using the unused pump power from the second stage, and wherein a filter is provided at the input of the second stage for shaping the intensity profile of the unused pump power propagating from the second stage to the first stage.

7. A method of amplifying optical signals, the method comprising supplying optical signals for amplification to the first stage of a multiple stage Raman amplifier, the multiple stage Raman amplifier comprising at least first and second stages, the first stage comprising a distributed Raman amplifier, the method comprising amplifying the signal in the first stage by providing a pump signal to the first stage, the pump signal including unused pump power of a plurality of pump sources from the second stage, and subsequently amplifying the signal in the second stage, wherein the method further comprises filtering the unused pump power from the second stage before forming the pump signal for the first stage, thereby shaping the intensity profile of the unused pump power propagating from the second stage to the first stage.

8. A method as claimed in claim 7, in which the pump signal to the first stage includes additional pump power selected such that the combined pump powers provide a desired pump power spectrum.

9. A method as claimed in claim 7, in which the second stage comprises a discrete Raman amplifier.

* * * * *